US005241427A

United States Patent [19]

Lin

[11] Patent Number: 5,241,427

[45] Date of Patent: Aug. 31, 1993

[54] MESSAGE DOOR LOCK APPARATUS

[76] Inventor: Fu-Tung Lin, c/o Hung Hsing Patent Service Center, P.O. Box 55-1670, Taipei, Taiwan

[21] Appl. No.: 747,277

[22] Filed: Aug. 19, 1991

[51] Int. Cl.$^5$ .................... G11B 5/00

[52] U.S. Cl. .................... 360/1; 360/12; 365/244

[58] Field of Search .................... 360/1, 12; 369/22, 20, 369/69; 340/545, 692; 365/244

[56] References Cited

U.S. PATENT DOCUMENTS

| | | | |
|---|---|---|---|
| 4,100,581 | 7/1978 | Slack et al. | 369/22 |
| 4,654,728 | 3/1987 | Lunsford | 360/12 |
| 4,715,060 | 12/1987 | Lipscher et al. | 360/12 |
| 4,763,111 | 8/1988 | Matsuo et al. | 340/545 |

FOREIGN PATENT DOCUMENTS

| | | | |
|---|---|---|---|
| WO9203820 | 3/1992 | PCT Int'l Appl. | 360/12 |

*Primary Examiner*—Robert J. Pascal
*Assistant Examiner*—Tan Dinh

[57] ABSTRACT

A message door lock includes a trigger switch for triggging a playing operation of a recorder and player operatively recorded for leaving a message in the recorder formed on a door lock, an actuator of the trigger switch mounted on a thumbturn or doorlock spindle having an insulator flange normally interrupting the trigger switch from a circuit of the recorder and player and having a pair of notches diagonally recessed in the flange, whereby upon a rotation of the thumbturn inside a door or unlocking the doorlock outside the door, the flange of the actuator is rotated to match the notch in the flange with the trigger switch for resiliently contacting the trigger switch with the contact of the recorder and player circuit for playing the message already recorded in the recorder whenever rotating the thumbturn or unlocking the doorlock for a convenient and safe messaging purpose.

6 Claims, 3 Drawing Sheets

MESSAGE DOOR LOCK APPARATUS

BACKGROUND OF THE INVENTION

A very popular way to leave a message is by writing down the words on a note paper. In a family life, it seems to be inconvenient to find a pen or a paper sheet for writing the message. Even a message is given on a paper, it will occur another problem, that is, where to locate the message and how to ensure the family member who will read the message clearly without missing the message?

It is therefore expected to invent a message lock by which anyone may leave message on a door lock for a convenient and safe messaging way.

SUMMARY OF THE INVENTION

The object of the present invention is to provide a message door lock including a trigger switch for trigging a playing operation of a recorder and player operatively recorded for leaving a message in the recorder formed on a door lock, an actuator of the trigger switch mounted on a thumbturn or doorlock spindle having an insulator flange normally interrupting the trigger switch from a circuit of the recorder and player and having a pair of notches diagonally recessed in the flange, whereby upon a rotation of the thumbturn inside a door or unlocking the doorlock outside the door, the flange of the actuator is rotated to match the notch in the flange with the trigger switch for resiliently contacting the trigger switch with the contact of the recorder and player circuit for playing the message already recorded in the recorder whenever rotating the thumbturn or unlocking the doorlock for a convenient and safe messaging purpose.

DETAILED DESCRIPTION

Figure 4:
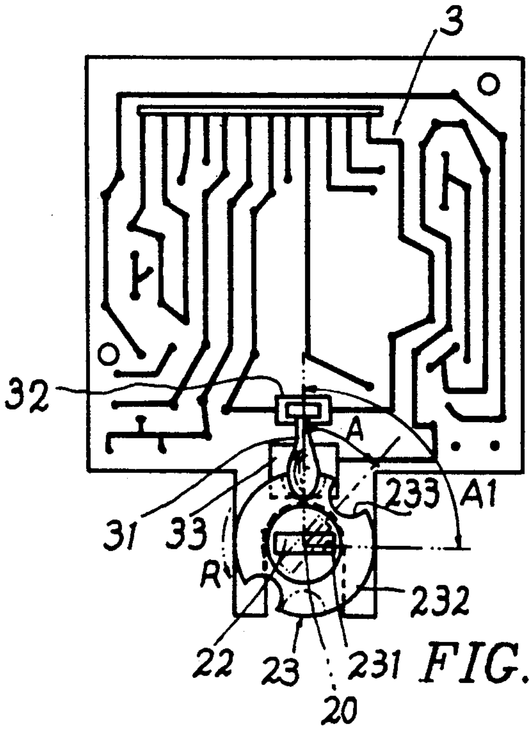
FIG. 4 shows a circuit of the present invention.
Figure 1:
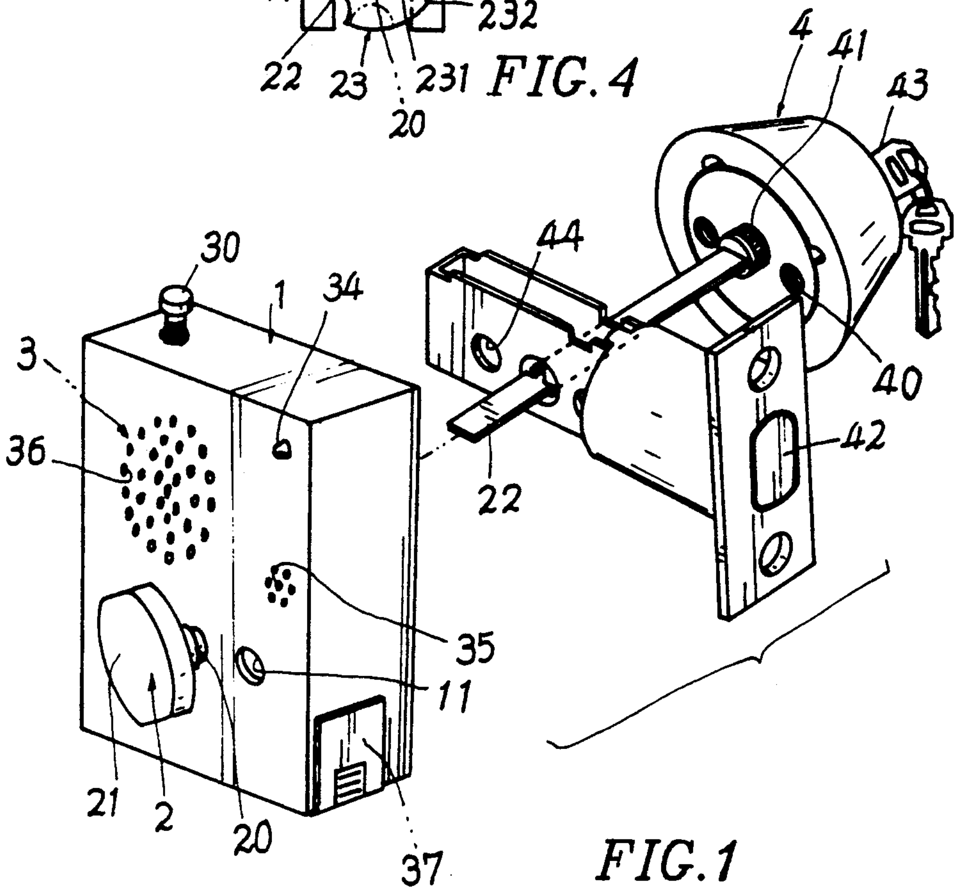
FIG. 1 is a perspective view showing the present invention to be assembled with a door lock.

As shown in FIGS. 1–5, a message door lock of the present invention comprises: a casing 1, a trigger means 2, a recording and playing circuit means 3, and a door lock 4 fixed on a door 5.

The casing 1 is secured inside the door 5 by bolts passing through the holes 11 of the casing 1, the holes 44, 40 formed in the door lock 4 and is formed with a sleeve hole 12 through the casing 1 for rotatably mounting a sleeve portion 20 of the trigger means 2 on the casing 1 by a washer 13 and a washer 14 having ratchet teeth formed in the washer 14 for retaining the sleeve portion 20 to be rotatable in the casing 1.

Figure 2:
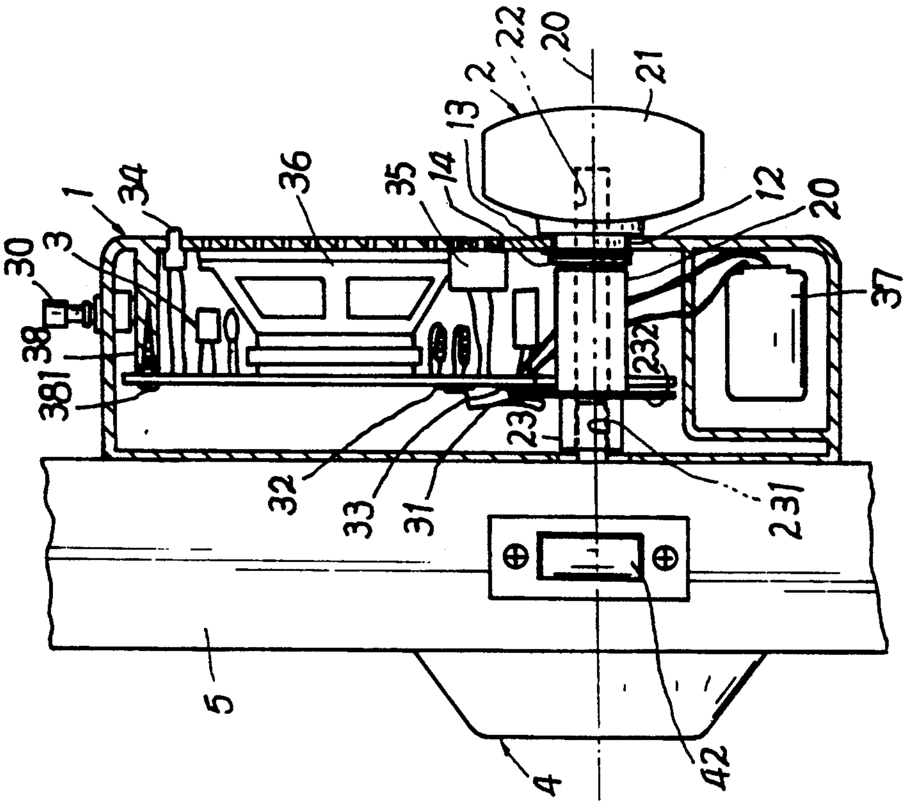
FIG. 2 is a partial sectional drawing of the present invention when assembled.
Figure 3:
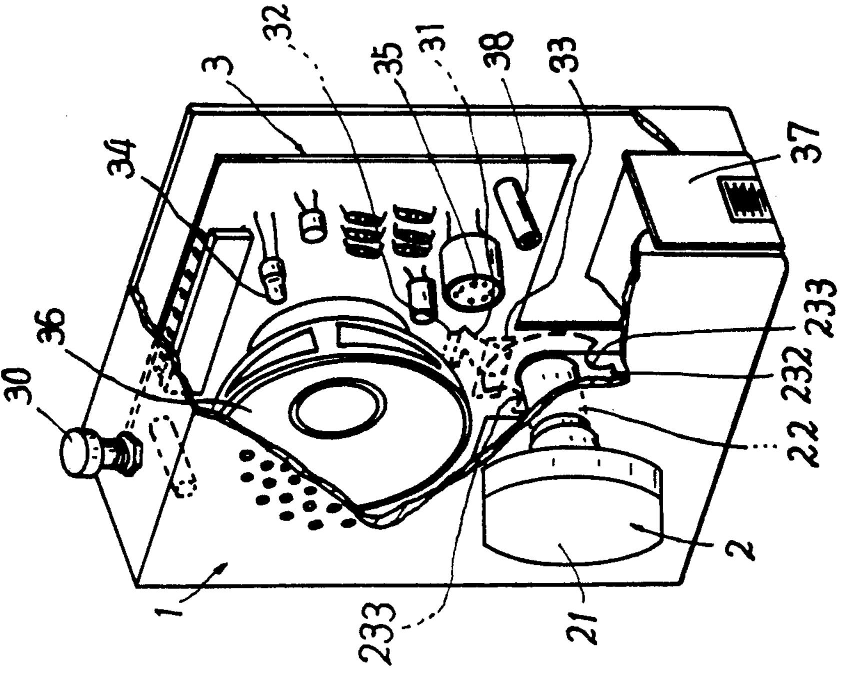
FIG. 3 is a partial cut-away illustration of the present invention.

The trigger means 2 includes: a thumbturn 21 secured on an inner end portion of the sleeve portion 20 rotatably mounted in the casing 1, a spindle 22 secured in the sleeve portion 20 and the thumbturn 21 of the trigger means 2 protruding outwardly along a longitudinal axis 20 to be secured with a deadbolt 42 to be operatively locked on a door frame (not shown) and secured with a locking core 41 of the door lock 4 formed on an outside of the door 5, and a trigger-switch actuator 23 secured on a middle portion of the spindle 22 to be operatively rotated within the casing 1 as shown in FIG. 2.

The trigger-switch actuator 23 includes a cylindrical portion 230 having a spindle hole 231 formed in a central portion of the cylindrical portion 230 engageable with the spindle 22 for securing the actuator 23 with the spindle 22, an insulator flange 232 made of electrical insulative material secured with the cylindrical portion 230, and a pair of notches 233 diagonally recessed in an outer perimeter of the flange 232.

The recording and playing circuit means 3 stored within the casing 1 includes: a main switch 30 for switching on or off of a power source 37 of the circuit means 3, a trigger switch 31 operatively conducting a first contact 32 and a second contact 33 both contacts 32, 33 normally opened and operatively closed to be electrically connected to a recording and playing circuit which may be a conventional integrated circuit having function for receiving input speech signal when recording, for the memory of the input speech signal and for outputting speech signal which is transduced as audible speech when playing, a lamp indicator 34 selected from a light emitting diode (LED) which is lit indicating the circuit ready for recording and is flashed indicating the circuit ready for playing, a microphone 35 for receiving the input speech signal when recording, a loud speaker 36 for sounding the audible speech when playing, and power source 37 which may be dry batteries stored in the casing 1 having several stems 38 protruding from an inside surface of the casing for fixing the circuit means 3 in the casing 1 by screws 381 as shown in FIG. 2.

Figure 5:
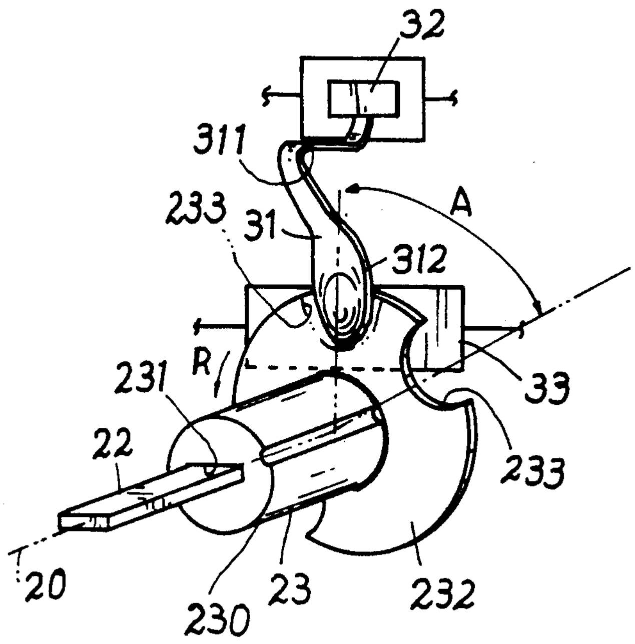
FIG. 5 shows an actuator with a trigger switch in accordance with the present invention.

The trigger switch 31 made of electrical conductive material as shown in FIGS. 2, 4 and 5 includes: a fixed end portion 311 secured to and electrically conducted with the first contact 32 of the recording and playing circuit means 3, and a free plate portion 312 generally spoon shaped having a side edge portion sloping upwardly sidewardly for slidably guiding the flange 232 of the actuator 23 in between the free plate portion 312 of the trigger switch 31 and the second contact 33 of the recording and playing circuit means 3.

The notch 233 of the trigger-switch actuator 23 has an area slightly larger than an area of the free plate portion 312 of the trigger switch 31.

The trigger switch 31 has the free plate portion 312 normally separated from the second contact 33 of the circuit means 3 as shielded by the flange 232 of the actuator 23, and operatively conducted with the second contact 33 when rotating the actuator 23 to unshield the flange 232 to match the notch 233 with the free plate portion 312 of the trigger switch 31.

The notch 233 and the free plate portion 312 of the trigger switch 31 define an acute angle A such as 45 degrees smaller than a spindle rotating angle A such as 90 degrees for rotating the spindle 22 when rotating the thumbturn 21 from inside the door or rotating the lock core 41 of the door lock 4 when unlocking the lock 4 by a key 43 from outside the door 5.

In using the present invention, the main switch 30, which is formed as a push button protruding upwardly beyond the casing 1, is depressed to power the circuit means 3 ready for recording and the LED (or lamp indicator) 34 is lit indicating the recording circuit capable of being recorded now. After recording a message in the circuit means 3, the circuit means 3 will automatically repeat the message speech for one time to be checked by the person who leaves the message. Then, the person (he or she) will close and lock the door by rotating the locking core 41 and spindle 22 to also rotate the actuator 23 in direction R as shown in FIG. 4 to match the notch 233 with the trigger switch 31 so as to close the contacts 32, 33 to trigger the recording and playing circuit means 3 for playing the recorded message once again to check the recording effect even staying outside the door. The LED is then flashed for warning a message left in the circuit means 3.

By the way, the message is then recorded in the circuit means 3 on the door lock ready for repeatedly playing uses so that any other family member such as his wife (or her husband), after waking up, may watch the flashing LED and will rotate the thumbturn 21 to trigger the switch 31 to close the contacts 32, 33 for playing the recorded message, thereby providing a very convenient messaging method without requiring any paper and pen, but with safer and convenient leaving or receiving message. When triggering the switch 31, the spindle 22 is rotated to allow the notch 233 to pass the plate portion 312 of the switch 31 without stopping there. Once the notch 233 is passed, the two contacts 32, 33 will be conducted to trigger the circuit 3.

Any integrated circuit of the recording and playing circuit means 3 may be suitably selected or modified in this invention by those skilled in the art, without being limited in the present invention.

I claim:

1. A message door lock comprising:

a casing secured inside a door;

a recording and playing circuit means having a recording and playing circuit mounted in said casing for operatively recording a message speech therein and for playing or outputting the message speech therefrom, and having a trigger switch operatively actuating a first contact and a second contact electrically connected with said recording and playing circuit for triggering said recording and playing circuit means for playing a recorded message pre-recorded therein; and a trigger means formed on a door lock operatively rotated for triggering said trigger switch of said recording and playing circuit means for playing the recorded message pre-recorded in said recording and playing circuit means;

said recording and playing circuit means including: a main switch for switching on or off of a power source of the circuit means, the trigger switch operatively actuated by said trigger means for conducting the first contact and the second contact both contacts normally opened and operatively closed to be connected to the recording and playing circuit having function for receiving input speech signal when recording for the memory of the input speech signal and for outputting speech signal which is transduced as audible speech when playing a lamp indicator selected from a light emitting diode which is lit indicating the circuit ready for recording and is flashed indicating the circuit ready for playing, a microphone for receiving the input speech signal when recording, and a loud speaker for sounding the audible speech when playing; and said trigger means including: a thumbturn secured on an inner end portion of a sleeve portion rotatably mounted in the casing, a spindle secured in the sleeve portion and the thumbturn of the trigger means protruding outwardly along a longitudinal axis to be secured with a deadbolt to be operatively locked on a door frame and secured with a locking core of the door lock formed on an outside of the door, and a trigger-switch actuator secured on a middle portion of the spindle to be operatively rotated within the casing.

2. A message door lock according to claim 1, wherein said trigger-switch actuator includes a cylindrical portion having a spindle hole formed in a central portion of the cylindrical portion engageable with the spindle for securing the actuator with the spindle, and an insulator flange made of electrical insulative material secured with the cylindrical portion, and a pair of notches diagonally recessed in an outer perimeter of the flange.

3. A message door lock according to claim 1, wherein said trigger switch made of electrical conductive material includes: a fixed end portion secured to and electrically conducted with the first contact of the recording and playing circuit means, and a free plate portion generally spoon shaped having a side edge portion sloping upwardly sidewardly for slidably guiding the flange of the actuator in between the free plate portion of the trigger switch and the second contact of the recording and playing circuit means.

4. A message door lock according to claim 2, wherein each said notch of the trigger-switch actuator has an area slightly larger than an area of the free plate portion of the trigger switch.

5. A message door lock according to claim 3, wherein said trigger switch has the free plate portion normally separated from the second contact of the circuit means as shielded by the flange of the actuator, and operatively conducted with the second contact when rotating the actuator to unshield the flange to match the notch with the free plate portion of the trigger switch.

6. A message door lock according to claim 2, wherein each said notch and the free plate portion of the trigger switch define an acute angle smaller than a spindle rotating angle for rotating the spindle for actuating the trigger means for playing the recording and playing circuit means when rotating the thumbturn from inside the door or rotating the lock core of the door lock when unlocking the lock by a key from outside the door.

* * * * *